(12) United States Patent
Meng et al.

(10) Patent No.: US 6,191,607 B1
(45) Date of Patent: Feb. 20, 2001

(54) PROGRAMMABLE BUS HOLD CIRCUIT AND METHOD OF USING THE SAME

(75) Inventors: Anita X. Meng, Milpitas; Roger Bettman, Los Altos; Barry Loveridge, San Jose, all of CA (US)

(73) Assignee: Cypress Semiconductor Corporation, San Jose, CA (US)

( * ) Notice: Under 35 U.S.C. 154(b), the term of this patent shall be extended for 0 days.

(21) Appl. No.: 09/153,941

(22) Filed: Sep. 16, 1998

(51) Int. Cl.$^7$ .................................................. H03K 19/173
(52) U.S. Cl. .................................. 326/37; 326/56; 326/83
(58) Field of Search .................................. 326/21, 30, 31, 326/38, 49, 50, 56, 83, 86

(56) References Cited

U.S. PATENT DOCUMENTS

| | | | |
|---|---|---|---|
| 5,027,012 | * | 6/1991 | Saeki et al. ............................. 326/83 |
| 5,668,482 | * | 9/1997 | Roskell ................................... 326/31 |
| 5,739,702 | * | 4/1998 | Shigehara et al. ..................... 326/83 |
| 5,764,075 | * | 6/1998 | Fukushima ............................. 326/38 |
| 5,894,230 | * | 4/1999 | Voldman ................................ 326/83 |

* cited by examiner

Primary Examiner—Michael Tokar
Assistant Examiner—Don Phu Le
(74) Attorney, Agent, or Firm—Wagner, Murabito & Hao LLP (57) ABSTRACT

A programmable bus hold circuit which may find application in programmable logic devices, memories and other I/O devices may include a first element for receiving a voltage from an I/O pad and programmable circuitry coupled to the first element for controlling whether the voltage at the pad is to be held its current logic level. The first element may be a logic gate (such as a NOR gate) the programmable circuit may include a tristatable buffer (e.g., under the control of a memory cell or other programmable bit capable of enabling or disabling the programmable bus hold circuit) or a switch (e.g., a transistor).

16 Claims, 7 Drawing Sheets

PROGRAMMABLE BUS HOLD CIRCUIT AND METHOD OF USING THE SAME

FIELD OF THE INVENTION

The present invention relates generally to the field of computer input/output devices, and more specifically, to circuits that reduce input/output bus contention as may be used in such devices.

BACKGROUND

Conventional input/output ("I/O") devices commonly used in computer systems are often required to quickly drive I/O buses that are connected to I/O pins in order to meet various timing specifications. To meet these requirements, I/O devices are typically equipped with output drivers that have high signal switching strengths. When the output driver is turned off there is a potential problem on the bus. A user may pull the bus either high or low with external circuitry, but this may cause excess noise due to many outputs switching simultaneously. Accordingly, a conventional solution of preventing bus contention is to add a bus hold circuit (e.g., configured as a weak latch).

Although using bus hold circuits reduces the bus noise level, bus hold circuits are not always needed or desirable. For example, if an application requires that multiple I/O pins be tied together, a number of individual bus hold circuits associated with these pins may consume a large amount of operating current. Consequently, a voltage level held by the multiple bus hold circuits may tend to be more difficult to override. Further, some users may wish to purchase I/O devices that are not constructed with bus hold circuits because of the expected cost savings which may result. Unfortunately, it would be cost prohibitive for a manufacturer to produce two identical devices with one version having bus hold circuits and another without such circuits. Thus, a solution is needed.

SUMMARY OF THE INVENTION

A programmable bus hold circuit which may find application in programmable logic devices, memories and other I/O devices may include a first element for receiving a voltage from an I/O pad and programmable circuitry coupled to the first element for controlling whether the voltage at the pad is to be held its current logic level. The first element may be a logic gate (such as a NOR gate) the programmable circuit may include a tristatable buffer (e.g., under the control of a memory cell or other programmable bit capable of enabling or disabling the programmable bus hold circuit) or a switch (e.g., a transistor).

BRIEF DESCRIPTION OF THE DRAWINGS

The present invention is illustrated by way of example and not limitation in the figures of the accompanying drawings in which.

DETAILED DESCRIPTION

Described herein is a programmable bus hold circuit and methods of using the same. The programmable bus hold circuit may find application in an I/O device, which may be a memory, a bus control unit, a programmable logic device, a microprocessor, etc. The programmable bus hold circuit, which may be controlled by a programmable bit (e.g., stored in an associated memory cell or register), is configured to hold the voltage at an input/output (I/O) pin of the I/O device at a desired voltage potential, preferably utilizing a smaller amount of current than was may be used by an associated I/O driver. The programmable bit is used to activate and deactivate the programmable bus hold circuit. In other words, the programmable bit may logically disconnect the programmable bus hold circuit from the associated I/O pin(s).

Figure 1:
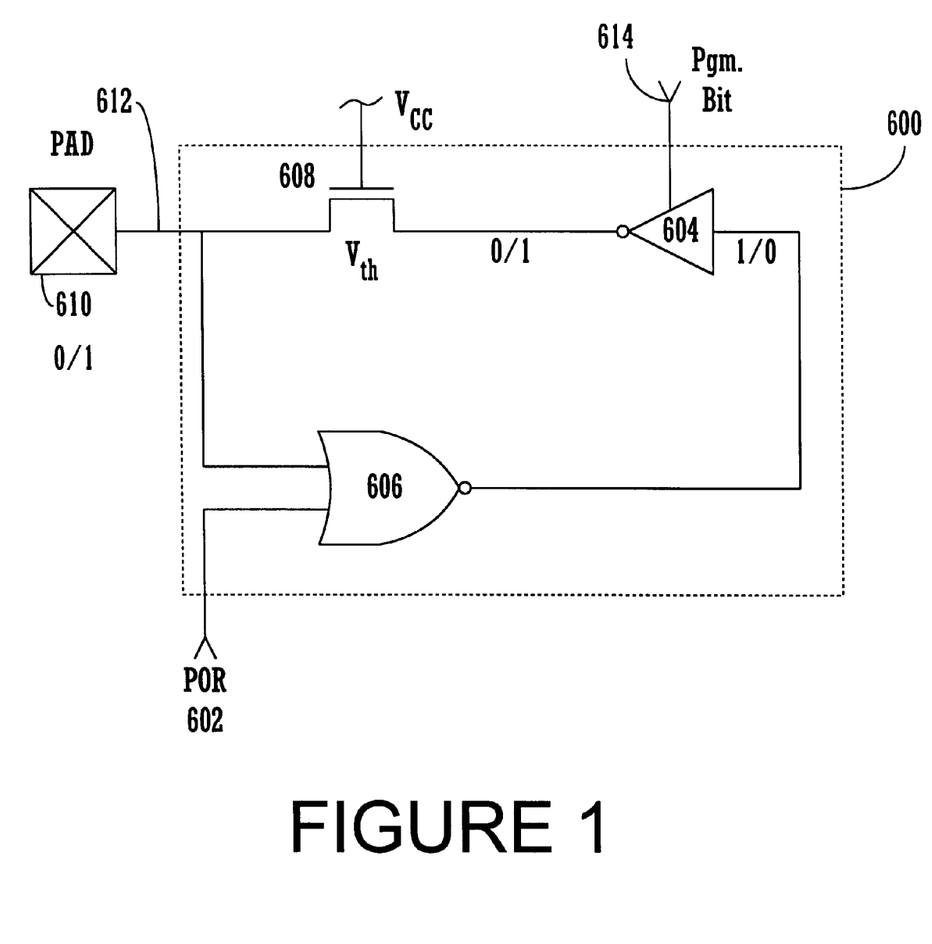
FIG. 1 illustrates a programmable bus hold circuit configured in accordance with one embodiment of the present invention.

Referring to FIG. 1, one embodiment of a programmable bus hold circuit 600 is illustrated. Preferably, programmable bus hold circuit 600 is utilized with an I/O driver as described above. For sake of clarity, the I/O drive is not shown. Those of ordinary skill in the art will recognize that programmable bus hold circuit 600 may be included in any or all types of I/O devices (e.g., memories, bus control units, microprocessors, programmable logic devices, etc.).

Programmable bus hold circuit 600 includes a NOR gate 606, a tri-sate buffer 604, and an NMOS transistor 608. Programmable bus hold circuit 600 is coupled to I/O pad 610 which may be coupled to an associated I/O pin (not shown). In particular, pad 610 is coupled to a first input of NOR gate 606. Notice that a power-on-reset ("POR") signal 602, which is a reset input signal, is coupled to a second input of NOR gate 606. The output of NOR gate 606 is coupled to the input of tri-state buffer 604. Tri-state buffer 604 is under the control of a programmable bit 614, which is coupled to a control input of buffer 604. Programmable bit 614 may be used to activate and deactivate the buffer 604 and it may be implemented as a memory cell or other register which may be programmed at the time of manufacture or subsequent thereto. For example, programmable bit 614 may be set by functional logic within the I/O device containing programmable bus hold circuit 600. The output of buffer 604 is coupled to the source of NMOS transistor 608 while the gate of NMOS transistor 608 is connected to Vcc. The drain of NMOS transistor 608 is connected to I/O pad 610. Thus, programmable bus hold circuit 600 is arranged as a programmable feed back path associated with an output thereof.

Figure 2:
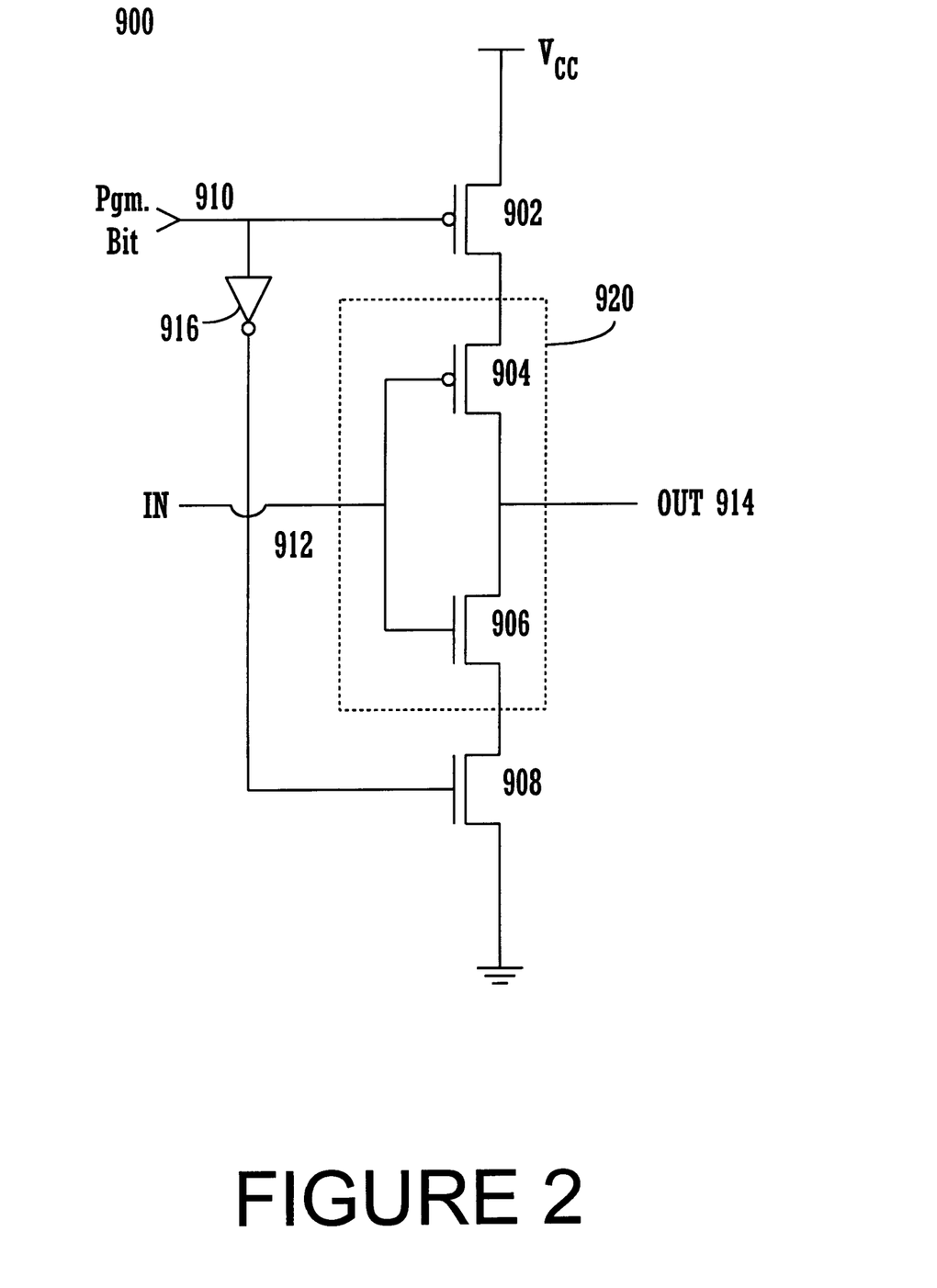
FIG. 2 illustrates an embodiment of an inverter that is controlled by programmable bit in accordance with one embodiment of the present invention.

FIG. 2 illustrates one embodiment of a tri-state buffer 900 controlled by programmable bit 910 and suitable for use with the programmable bus hold circuits described herein. In this embodiment, the tri-state buffer 900 includes a first PMOS transistor 902, a second PMOS transistor 904, a first NMOS transistor 906, a second NMOS transistor 908, and an inverter 916. The source of PMOS transistor 902 is coupled to Vcc and the gate of PMOS transistor 902 is coupled to programmable bit 910. The drain of PMOS transistor 902 is coupled to the source of PMOS transistor 904 and the drain of PMOS transistor 904 is coupled to output of the buffer 914. The gates of both PMOS transistor 904 and NMOS transistor 906 are coupled to the input of the buffer 912 while the drain of NMOS transistor 906 is connected to output of the buffer 914. The source of NMOS transistor 906 is coupled to the drain of NMOS transistor 908. The source of NMOS transistor 908 is coupled to ground. The gate of NMOS transistor 908 is coupled to output of the inverter 916 and the programmable bit 910 is coupled to the input of the inverter 916.

In operation, when the programmable bit 910 is set to activate the programmable bus hold circuit, i.e., such that both PMOS transistor 902 and NMOS transistor 908 are on, PMOS transistor 904 and NMOS transistor 906 behave as a logic inverter. Similarly, when the programmable bit 910 is set such that the programmable bus hold circuit is inactive, i.e., when both PMOS transistor 902 and NMOS transistor 908 are off, PMOS transistor 904 and NMOS transistor 906 do not perform a inverting function, since power supplies for both PMOS transistor 904 and NMOS transistor 906 have been logically disconnected. Accordingly, buffer 920, may be enabled or disabled, according to the state of programmable bit 910.

Returning to FIG. 1, the output of NOR gate 606 is a logical zero if the voltages at either POR 602 or Pad 610, or both, are logical ones. Conversely, the output of NOR gate 606 is a logical one if both POR 602 and Pad 610 are logical zeros. The output of NOR gate 606 is coupled to the input of buffer 604, which is controlled by the programmable bit 614. As discussed with reference to FIG. 2, programmable bit 614 may be set to enable or disable buffer 604.

If programmable bit 614 is active, buffer 604 performs its function by logically inverting the state of input data, which is the output of NOR gate 606. Thus when active buffer 604 outputs a logical one whenever the voltages at POR 602 or pad 610, or both, are logical ones. Conversely, buffer 604 outputs a logical zero if the voltages at both POR 602 and pad 610 are logical zeros. The output of buffer 604 is provided to the source of NMOS transistor 608 and the drain of NMOS transistor 608 is connected to the pad 610. Consequently, the voltage level at pad 610 may be "recirculated" so that the voltage at pad 610 is held at its logic level by the programmable bus hold circuit 600 when the external voltage at pad 610 is removed. Because the NMOS transistor 608 has an associated threshold voltage VTH, programmable bus hold circuit 600 may impose a voltage drop of VTH.

If programmable bit 614 is inactive, buffer 604 is deactivated and the programmable bus hold circuit 600 is logically disconnected from the pad 610. Accordingly, the programmable bit 614, which may be set using a memory cell or any of the other means discussed above, may enable or disable the operation of programmable bus hold circuit 600.

Figure 3:
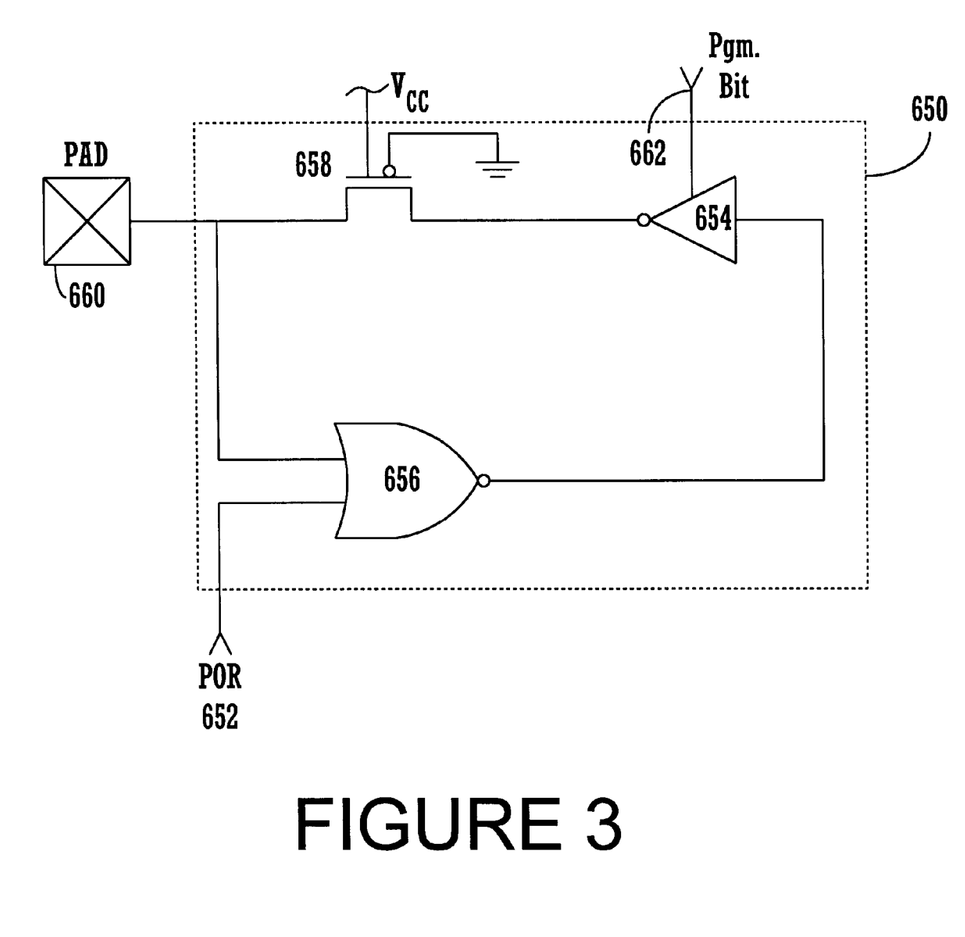
FIG. 3 illustrates a programmable bus hold circuit in accordance with an alternative embodiment of the present invention.

FIG. 3 illustrates another embodiment of a programmable bus hold circuit 650. Bus hold circuit 650 includes a NOR gate 656, a buffer 654, which is controlled by programmable bit 662, and a transmission gate 658. An I/O pad 660 is coupled to the programmable bus hold circuit 650 in a fashion similar to that described above. Programmable bus hold circuit 650 operates in a fashion similar to programmable bus circuit 600 of FIG. 1 with the exception that the use of a full CMOS transmission gate 658 avoids the threshold voltage drop that may be caused by NMOS transistor 608.

Figure 4:
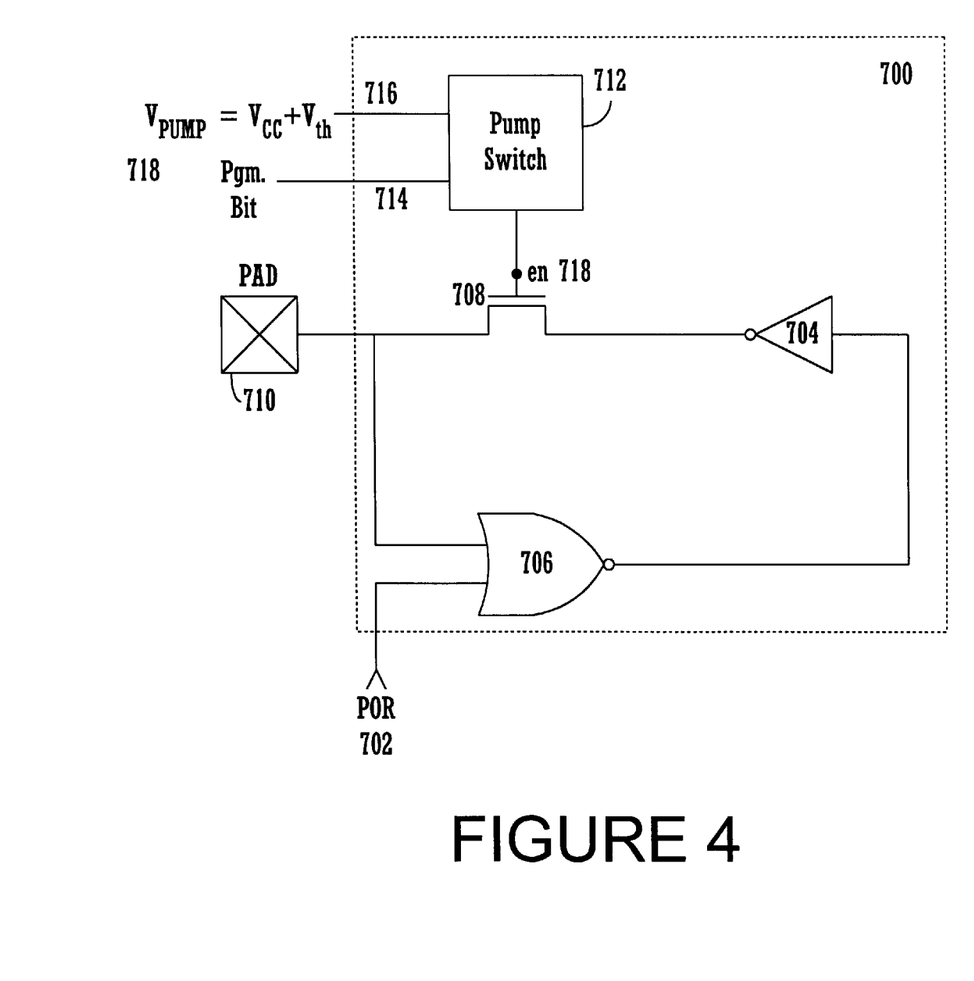
FIG. 4 illustrates another alternative programmable bus hold circuit in accordance with yet another embodiment of the present invention.

FIG. 4 illustrates a programmable bus hold circuit 700, which is yet another embodiment of the present invention. Programmable bus hold circuit 700 includes a NOR gate 706, an inverter 704, an NMOS transistor 708, and pump switch 712. Programmable bus hold circuit 700 is coupled to I/O pad 710. The pad 710 is coupled to a first input of NOR gate 706 and POR 702 is coupled to a second input of NOR gate 706. The output of NOR gate 706 is coupled to the input of inverter 704. The output of inverter 704 is coupled to the source of NMOS transistor 708 while the gate of NMOS transistor 708 is connected to the output of pump switch 712. The drain of NMOS transistor 708 is connected to the pad 710. Programmable bit 714 is coupled to a first input of pump switch 712 and a voltage Vpump 718 (which is a voltage approximately equal to Vcc, the operating voltage of the I/O device that includes programmable bus hold cct 700, plus the threshold voltage VTH of transistor 708) is applied to a second input of pump switch 712.

The output of NOR gate 706 is a logical zero if the voltage at either POR 702 or pad 710, or both, are logical ones. Otherwise, the output of NOR gate 706 is a logical one if the voltages at both POR 702 and pad 710 are logical zeros. Pump switch 712 is configured to control the NMOS transistor 708 according to the state of programmable bit 714. If programmable bit 714 is active, pump switch 712 turns on NMOS transistor 708 and the voltage potential at the pad 710 is held at a desired level. Similarly, if programmable bit 714 is inactive, pump switch 712 turns off NMOS transistor 708 so that the programmable bus hold circuit 700 is logically decoupled from I/O pad 710.

The state of programmable bit 714 may be set by storing a logic 1 or 0 in a volatile or non-volatile memory cell. The state of programmable bit 714 may also be set using functional logic associated with the I/O device that includes programmable bus hold circuit 700. When an application does not require a bus hold function, a non-volatile memory cell may be used to permanently disable the programmable bus hold circuit 700 by setting the programmable bit 714 inactive. Yet in other applications, programmable bus hold circuit 700 may be turned on and off by functional logic (or by writing to a volatile memory cell) depending upon whether the bus hold function is needed or not.

When programmable bit 714 activates pump switch 712, pump switch 712 provides the voltage Vpump at the "en" (enable) node 718. Because the NMOS transistor 708 will be switched on, the voltage at pad 710 will be held at its current state (logic 1 or 0) when an external voltage on pad 710 is removed. If pump switch 712 is disabled, the NMOS transistor 708 is switched off and the pad 710 will be logically decoupled from programmable bus hold circuit 700.

Figure 5:
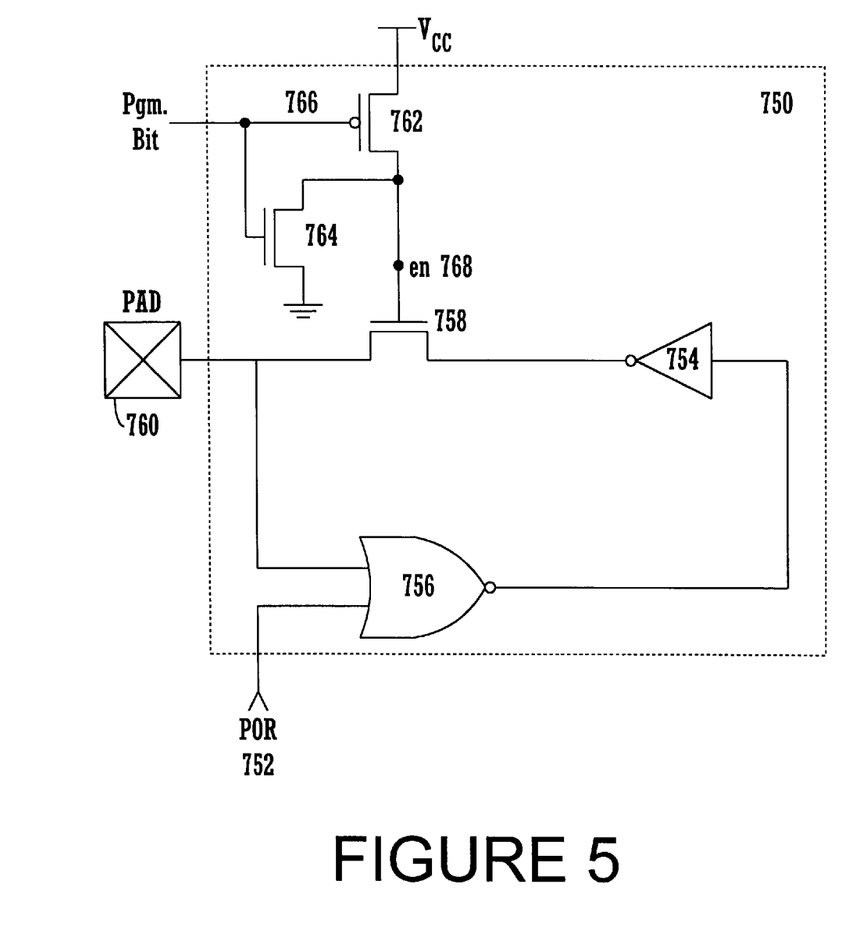
FIG. 5 illustrates a further programmable bus hold circuit in accordance with yet another embodiment of the present invention.

FIG. 5 illustrates yet another embodiment of a programmable bus hold circuit 750. Programmable bus hold circuit 750 is coupled to I/O pad 760 and includes a NOR gate 756, an inverter 754, a first NMOS transistor 758, a PMOS transistor 762, and a second NMOS transistor 764. The pad 760 is coupled to a first input of NOR gate 756 and POR 752 is coupled to a second input of NOR gate 756. The output of NOR gate 756 is coupled to the input of inverter 754 and the output of inverter 754 is coupled to the source of NMOS transistor 758. While the gate of NMOS transistor 758 is connected to "en" node 768, the drain of NMOS transistor 758 is connected to the pad 760. The source of PMOS transistor 762 is coupled to Vcc and the drain of PMOS transistor 762 is connected to the "en" node 768. Programmable bit 766 is coupled to the gates of PMOS transistor 762 and NMOS transistor 764. The source of NMOS transistor 764 is connected to ground and the drain of NMOS transistor 764 is coupled to the "en" node 768.

The NOR gate 756 outputs a logical zero if the voltage at either POR 752 or pad 760, or both, are logical ones. Otherwise, the output of NOR gate 756 is logical one if the voltage at both POR 752 and pad 760 are logical zeros. The PMOS transistor 762 and NMOS transistor 764 from a logic inverter and drive the "en" node 768 high or low in response to the state of programmable bit 766. Because both PMOS transistor 762 and NMOS transistor 764 are controlled by the programmable bit 766, either PMOS transistor 762 or NMOS transistor 764 can be on at any given time. Since NMOS transistor 758 is controlled by the voltage at "en" node 768, the programmable bit 766 essentially controls NMOS transistor 758, which determines whether the programmable bus hold circuit 768 is logically coupled to the pad 760.

For example, if the programmable bit 766 is a logical zero, PMOS transistor 762 will be on and NMOS transistor 764 will be off. Thus, PMOS transistor 762 pulls up "en" node 768 to Vcc. Thus, NMOS transistor 758 is turned on and programmable bus hold circuit 750 is enabled. In other words, if the programmable bit 766 is active, the programmable bus hold circuit 750 will hold the voltage state present at the pad 760 after an external voltage is removed. Similarly, if programmable bit 766 is inactive, PMOS transistor 762 is off and NMOS transistor 764 is on. Because NMOS transistor 764 is on, the voltage at "en" node 768 is pulled down to ground, which turns off NMOS transistor 758. Accordingly, the programmable bus hold circuit 750 is logically decoupled from the pad 760.

Figure 6:
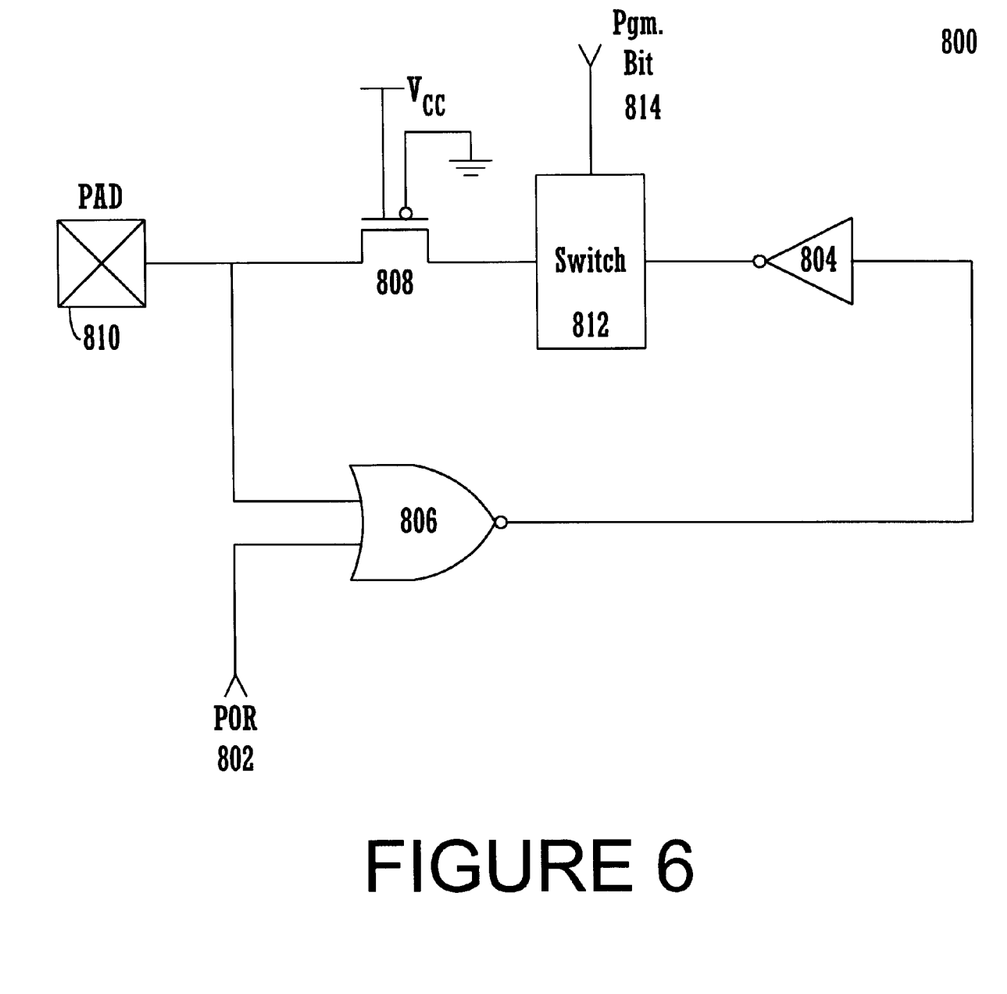
FIG. 6 illustrates an additional exemplary programmable bus hold circuit in accordance with still another embodiment of the present invention.

FIG. 6 illustrates yet another embodiment of a programmable bus hold circuit 800, which includes a NOR gate 806, an inverter 804, a transmission gate 808, and a switch 812. Programmable bus hold circuit 800 is coupled to I/O a pad 810. The pad 810 is coupled to a first input of NOR gate 806 and POR 802 is coupled to a second input of NOR gate 806. The output of NOR gate 806 is coupled to the input of inverter 804. The output of inverter 804 is coupled to the input of switch 812, which is controlled by a programmable bit 814. The output of switch 812 is coupled to transmission gate 808. In turn, the output of transmission gate 808 is coupled to pad 810.

Figure 7:
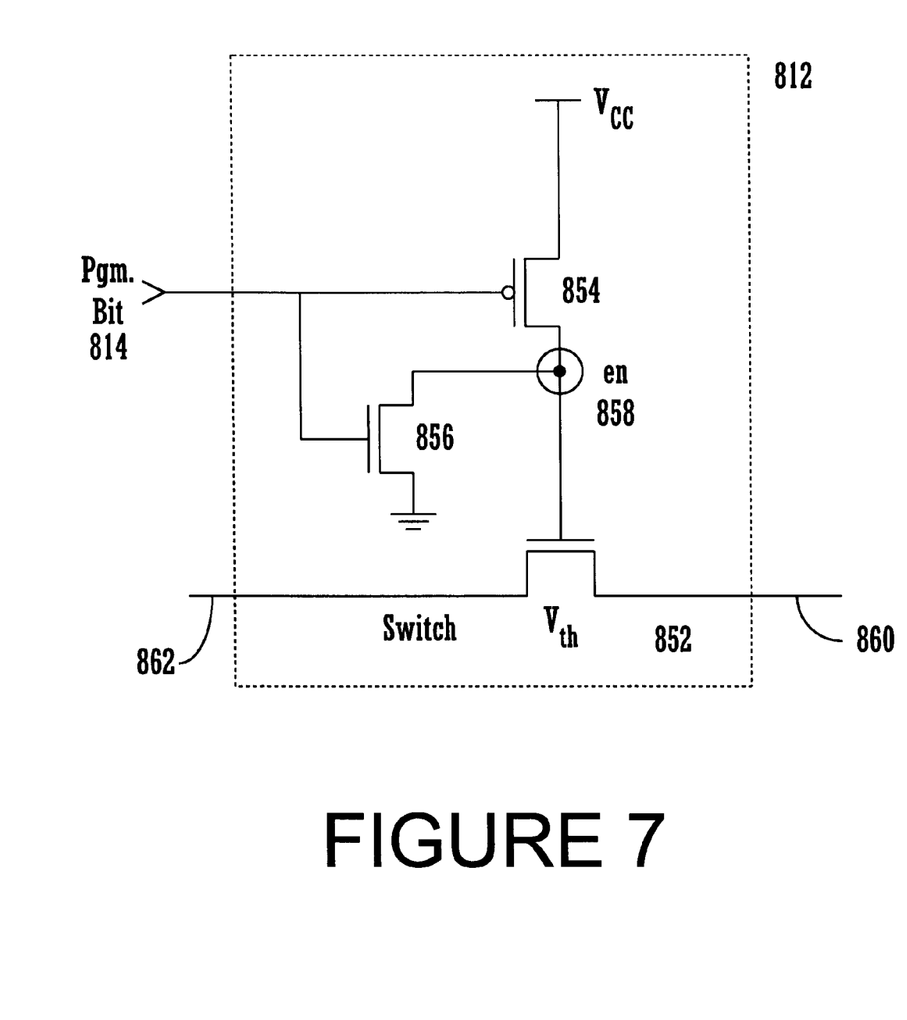
FIG. 7 illustrates an exemplary embodiment of a switch circuit for use with the programmable bus hold circuit illustrated in FIG. 6.

FIG. 7 illustrates one embodiment of switch 812 which is controlled by the programmable bit 814. In this embodiment, switch 812 includes a first NMOS transistor 852, a second NMOS transistor 856, and a PMOS transistor 854. The input of switch 860 is coupled to the source of NMOS transistor 852 and the output of switch 862 is coupled to the drain of NMOS transistor 852. The gate of NMOS transistor 852 is coupled to an "en" node 858, where the "en" node 858 is coupled to both drains of NMOS transistor 856 and PMOS transistor 854. While the gate of PMOS transistor 854 is coupled to programmable bit 814, the source of PMOS transistor 854 is connected to Vcc. Also, the gate of NMOS transistor 856 is coupled to programmable bit 814 and the source of NMOS transistor 856 is connected to ground.

In operation, when programmable bit 814 is active (a logic zero), it activates PMOS transistor 854 and deactivates NMOS transistor 856. In this situation, the voltage at "en" node 858 will be pulled up to Vcc because PMOS transistor 854 is on. Thus, it turns on NMOS transistor 852, and NMOS transistor 852 subsequently connects the input of switch 860 to the output of switch 862. In other words, when programmable bit 814 is active, it turns on switch 812 and enables programmable bus hold circuit 800. Similarly, when programmable bit 814 is inactive (a logic one), it deactivates PMOS transistor 854 and activates NMOS transistor 856. In this situation, the voltage at "en" node 858 is pulled down to ground. Since the voltage at "en" node 858 is at ground, NMOS transistor 852 is off. In other words, when programmable bit 814 is inactive, it turns off switch 812 and deactivates programmable bit hold circuit 800.

Returning to FIG. 6, the NOR gate 806 outputs a logic zero if the voltages at either POR 802 or pad 810, or both, are logical ones. Similarly, the output of NOR gate is logic one if both POR 802 and pad are logical zeros. The output of NOR gate 806 is coupled to the input of inverter 804 and the output of inverter 804 is connected to the input of switch 812, where switch 812 is turned on or off according to the state of programmable bit 814.

In operation, the inverter 804 inverts the signal received at its input, which is the output of the NOR gate 806. Thus, the inverter 804 produces a logic one output signal whenever the voltage at POR 802 or pad 810 is a logic one. The inverter 804 produces a logic zero if the voltage at both POR 802 and Pad 610 are logic zeros. The output of the inverter 804 is coupled to the input of switch 812. Assuming the programmable bit 814 is active, switch 812 is on and it passes the signal from inverter 804 to its output. Transmission gate 808 passes this signal to pad 810. Consequently, the voltages at pad 810 is held at its current state when an external voltage at pad 810 is removed. If programmable bit 814 is inactive, switch 812 is turned off and programmable bus hold circuit 800 is deactivated.

In the foregoing detailed description, the methods and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. For example, although illustrated using transistors such as NMOS transistor 608, other elements (e.g., a transmission gate, etc.) may be used for applying a voltage to a pad. Similarly, tristatable buffers, switches or other programmable circuitry may be coupled to that element for controlling whether the bus hold circuit is active or inactive. Accordingly, the present invention should be measured only in terms of the claims, which follows.

What is claimed is:

1. A bus hold circuit comprising:

a first element for receiving a voltage having a first logic level from an input/output pad; and a programmable tri-state buffer circuit coupled to the first element in a feedback path from the first element to the input/output pad for controlling whether the voltage at the input/output pad is held at the first logic level or is tri-stated.

2. The circuit of claim 1 wherein the first element comprises a logic gate.

3. The circuit of claim 2 wherein the logic gate is a logical NOR gate.

4. A programmable logic device comprising the circuit of claim 1.

5. The circuit of claim 1 wherein the programmable tir-state buffer circuit is under the control of a memory cell.

6. The circuit of claim 5 wherein the first element comprises a logic gate.

7. The circuit of claim 6 wherein the logic gate is a logical NOR gate.

8. The circuit of claim 1 wherein the programmable tri-state buffer circuit includes a pass gate transistor.

9. The circuit of claim 8 wherein the programmable tri-state buffer circuit is under the control of a memory cell.

10. The circuit of claim 9 wherein the first element comprises a logic gate.

11. The circuit of claim 1 wherein the programmable tri-state buffer circuit includes a transmission gate.

12. A method comprising programming a tri-state buffer included as part of a feedback path of a bus hold circuit to hold or tri-state a voltage at an input/output pad.

13. The method of claim 12 wherein the step of programming comprises setting or not setting a program bit to activate or not activate the tri-state buffer.

14. A bus hold circuit, comprising a feedback path including a programmable tri-state buffer coupled to an output of the circuit.

15. The bus hold circuit of claim 14 wherein the programmable feedback path includes a logic gate coupled to the input and the output of the programmable tri-state buffer.

16. The bus hold circuit of claim 15 wherein the logic gate comprises a NOR gate.

* * * * *